Aug. 17, 1965    P. DUSSOSSOY    3,201,100
HEAT EXCHANGE STRUCTURE FOR A ROTARY KILN
Filed July 24, 1962    2 Sheets-Sheet 1

Pierre Dussossoy

Aug. 17, 1965 P. DUSSOSSOY 3,201,100
HEAT EXCHANGE STRUCTURE FOR A ROTARY KILN
Filed July 24, 1962 2 Sheets-Sheet 2
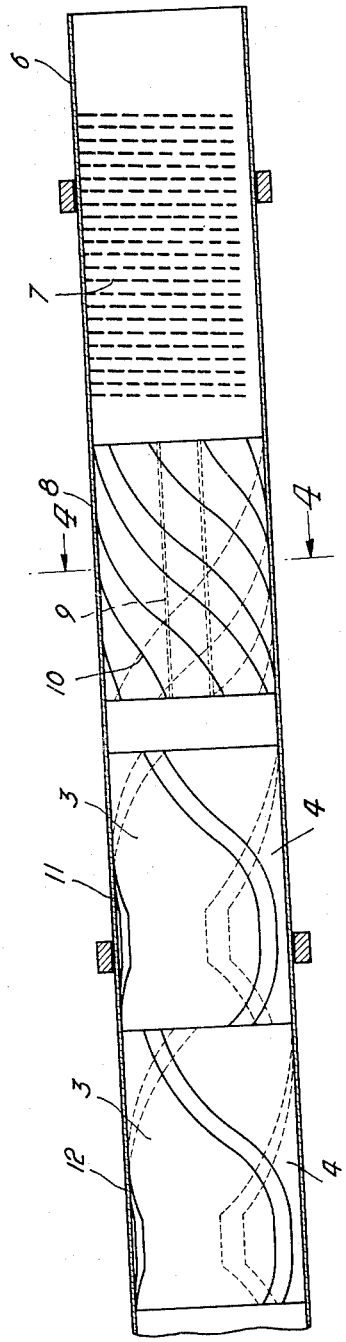
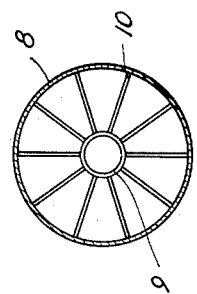
PIERRE DUSSOSSOY

United States Patent Office 3,201,100
Patented Aug. 17, 1965

3,201,100
HEAT EXCHANGE STRUCTURE FOR A ROTARY KILN
Pierre Dussossoy, Loos-lez-Lille, France, assignor to Ciments du Nord, Paris (Seine), France, a corporation of France
Filed July 24, 1962, Ser. No. 212,005
Claims priority, application France, Oct. 2, 1961, 874,808
6 Claims. (Cl. 263—33)

This invention relates to heat exchangers and more particularly to structures for accomplishing an effective exchange between the heat contents of a mass of divided solid materials and a stream of fluid, e.g. gas. An especially important class of applications contemplated by the invention relates to the heating or preheating of divided solid materials being treated in a rotary kiln by means of a stream of combustion gases, and the description will proceed with especial reference to this particular use although it should be understood that the invention is by no means restricted thereto.

Rotary kilns have come into wider and wider use in recent years in connection with an increasing variety of processes, owing especially to their simple and sturdy construction, ease in operation and maintenance, and high output capacity, which in present-day kilns may frequently attain 3000 tons per day. These qualities however should not blind one to the fact that rotary kilns as heretofore designed and constructed, inherently possess poor heat or very poor exchange properties. This defect is chiefly due to the very low effective areas of heat exchange present between the hot gases and cold materials in the kiln. Because of this the outlet temperature of the effluent flue gases from the kiln is high, being often as high as 800° C. in the case of dry processed materials, even though a countercurrent flow relationship is provided between the solids and gases through the kiln. In many installations the high heat content of the high-temperature effluent gases cannot be put to any practical use and is simply lost to the atmosphere. In all cases the high temperature of the flue gases indicates low inherent thermodynamic efficiency in the kiln, and much thought and effort has been expended in recent years to correct this deficiency in design, by endeavouring to increase the number and area of the heat exchange surfaces between the processed materials and the combustion gases.

In the operation of rotary kilns, and more especially those used in the manufacture of clinker cement and related products, it is well known from practical experience that the stage of the process offering the greatest difficulties is the initial heating stage during which the dry solid materials are being heated to the critical temperature range in which the desired conversion reactions will initiate. Thus in the case of cement stock this initial heating stage involves bringing the dry materials from about 100° C. to the range of about from 700 to 800° C. (depending on the composition of the mix) at which decarbonation reactions set in. It is found that even though this initial stage only corresponds to less than 20% of all the heat units given up by the combustion and flue gases to the solid material throughout its progress through the kiln, said stage actually requires for its successful completion a length of about 60% the total length of the kiln. This is a further consequence of the relatively small area of heat exchange surface present between the gases and solids, coupled with the low heat conductivity of these latter, responsible for the sluggishness of the heat exchange processes in this zone. The small heat exchange area is in turn a result of the fact that in the usual rotary kiln construction it is only the free upper surface of the heap of solid materials lying on the inner side surface of the kiln that is effectively exposed at any given time to the heating action of the combustion gases sweeping therepast through the interior of the kiln.

There have been many proposals in the prior art to correct this state of affairs by the provision of additional heat exchange means in association with a rotary kiln and thus increase the efficiency factor thereof. Such additional heat exchangers may either be provided externally of the kiln in the path of the materials being fed to it, or internally of the kiln itself.

The external heat exchangers (or preheaters) heretofore used or suggested have generally included masses, e.g. stacks, of materials having high heat capacity usually mounted for rotation in order to expose successive active portions thereof to the flow of gases and materials therepast alternately. Such preheaters are bulky, heavy, complicated, power-consuming and trouble-prone. Other types of known preheaters comprise grates adapted to support beds of the solid materials to be treated, in finely divided granular form; the need for comminuting the material constitutes an additional limitation or complication. Sometimes the preheaters have included cyclones or the like for performing the heat exchanging operation in the fluidized state, which also is impractical in connection with many types of solid stock. All such external exchangers or preheaters, while having high heat exchange performance and having their uses in many cases, especially in connection with finely ground stock, have serious drawbacks. In addition to their bulk and mechanical complexity generally involving moving parts exposed to high temperatures in corrosive atmosphere, they introduce considerable flow resistance to the gaseous stream. Moreover they generate considerable dust which in turn requires the supplementary provision of bulky dust-separating apparatus which further add to the problem of space and increase installation and maintenance costs.

The internal heat exchangers referred to above generally comprise bodies of heat exchange material disposed within the kiln, in the form e.g. of suspended chains, baffles of ceramic or metallic material, or enclosures filled with inert elements of similar material acting to divide the flowpath of the solids through the kiln. Such internal exchangers have given good results in connection with the drying of humid materials, but experience has shown that their effectiveness with dry materials is very low. Their general function is two-fold: increasing the exchange area and subdividing and milling the material to expose it more uniformly to the heating agent throughout its mass. In so doing however, these internal heat exchange structures as heretofore designed have simultaneously tended to increase the flow velocity of the combustion gases and increase the entrainment of dust and fines in the effluent gases, thereby resulting in losses of material out of the kiln sometimes amounting to 30% of the kiln throughput. The effluent fines are difficult to separate from the flue gases for recycling purposes so that the net gain in overall efficiency of the process afforded by internal heat exchangers has been very disappointing.

It is an object of this invention to provide an improved heat exchange structure of simple and efficient character, and one especially adapted for the exchange of heat between divided solid materials and a stream of gaseous fluid. Other objects include the provision of a simple efficient heat exchange structure having no separate moving parts, one that does not consume energy in operation, does not oppose substantial resistance to gas flow, require the solids to be comminuted to a high degree of fineness or generate dust. A consequent object is to provide such structure which will be especially suitable for use as an internal heat exchanger in rotary kilns. Another object is to provide an improved rotary kiln construction that will enhance very greatly the inherent operating efficiency of rotary kilns in connection with any kind of process in which such kilns may be used, e.g. cement manufacture. By incorporating the novel heat-exchange structures of the invention in cement kilns, it has been possible to increase the effective cement production rate by amounts ranging from 10% to 50%, while at the same time reducing the heat input rate by 10 to 30%.

An exemplary embodiment of the invention will now be described for purposes of illustration but not of limitation with reference to the accompanying drawings, wherein:

FIG. 3 is a simplified view in axial section of a rotary kiln embodying the invention; and FIG. 4 is a section on line 4—4 of FIG. 3.

Figure 1:
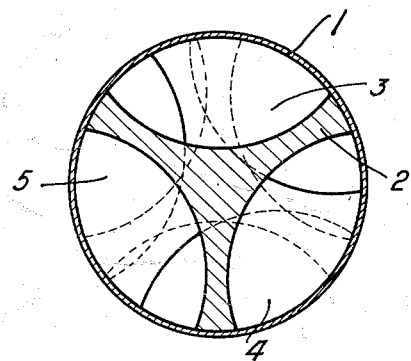
FIGS. 1 and 2 illustrate in simplified and diagrammatic form, an improved heat exchange structure in end view and side view respectively.
Figure 2:
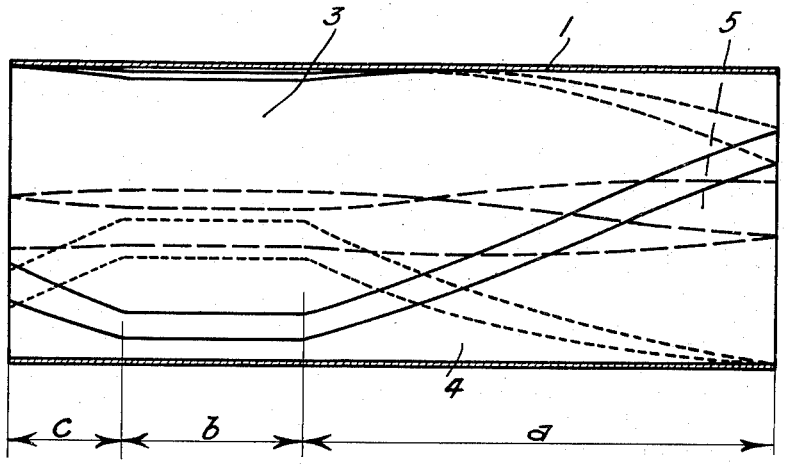

The heat exchange structure shown in FIGS. 1 and 2 comprises a generally cylindrical shell or casing 1 which may comprise refractory alloy sheeting, or alternatively refractory concrete. Within this casing is positioned a core 2, which may be formed of refractory concrete, brick, or metal. The core is formed with a plurality of generally longitudinal grooves or channels, herein three in number, 3, 4 and 5, extending from one end to the other of the core 2. Each of these channels has three interconnected longitudinal segments, respectively $a$, $b$ and $c$. The two end segments $a$ and $c$ are helical segments of opposite pitch, with segment $a$ having a greater axial length than segment $c$ as shown; the middle, interconnecting segment $b$ is straight and parallel to the axis of the core 2. In the operation of such a heat exchanger, as will appear more clearly hereinafter, solid materials are fed through the channels 3, 4, 5 in (leftward) the direction indicated by arrow $f$ in FIG. 2, while gases are discharged through the channels preferably (though not necessarily) in countercurrent relation to the solids, i.e. rightward in FIG. 2.

Referring to FIGS. 3 and 4, a preferred embodiment of the invention will now be described wherein the novel heat exchange structure of the type described with reference to FIGS. 1 and 2 is incorporated in a high-capacity rotary kiln for the manufacture of cement. The cylindrical body of the kiln is supported through conventional means, not shown in detail, for clockwise rotation, viewing FIG. 3 from the right or upstream end, about its axis which is inclined to the horizontal plane. The kiln in the exemplary construction shown includes four main sections along its length, 6, 8, 11 and 12. It will be understood that in operation cement stock to be treated is delivered to the upstream section 6, i.e., from the right hand end of the kiln and is advanced by gravity upon rotation of the kiln down the succeeding sections to be discharged from the left end of the kiln. Simultaneously, hot combustion gases generated by suitable combustion means are passed longitudinally through the body of the kiln in the rightward direction for counterflow heat exchange with the cement material.

The upstream or head section 6 is a filter section and is filled with suitable filter elements 7 of a conventional character, such as steel chains and the like. This filter section may be about 15 meters long. In this section the raw cement material having more than about 10% moisture content undergoes a preliminary filtering, drying and heating treatment, and is passed to the second heat exchange section 8.

Heat exchange section 8 is shown as comprising a cylindrical core 9 which may be of steel sheet, provided with helical radial vanes 10 also of steel sheet, ten in number as shown, which define helical channels between them. The next two heat exchange sections 11 and 12 are each constructed in the manner shown in FIGS. 1 and 2. Each of these sections has a core 2 e.g. of cast concrete formed with three channels each in three segments, the end segments being helices of reverse pitch and the intermediate segment being straight and parallel to the axis of the kiln. As shown, the helical end segments are unequal in length with the longer segment directed towards the upper input end of the kiln. Each of the three heat exchanger sections 8, 11 and 12 may be about 10 meters in length.

The remarkably high performance of a kiln including one or more heat exchanger sections of the type disclosed according to the invention can be attributed to several reasons. A highly efficient mixing is imparted to the solid materials advanced through the helical segments of reverse pitch. The reverse-pitch output segment such as $c$ serves to retard the discharge of the materials and prevent their high-speed fall-out in the form of "rain" which would otherwise generate much objectionable dust and fines, to be carried off with the effluent gas stream. Moreover, dust formation and entrainment is held to a minimum due to the low resistance opposed to gas flow through the channels.

This reduction in dust generation achieved in the output portion of the kiln using the heat exchangers according to the invention is an outstanding feature of the invention. As one advantageous consequence of this feature, it becomes possible to use a more thorough and efficient filtering step in the upstream section 6 of the kiln than would be feasible in a kiln of conventional construction. That is, when it was heretofore attempted to subject raw input materials having more than about 10% water content to an energetic filtering action, the large amount of dust and fines generated in the output sections of the kiln and carried upstream with the combustion gases would invariably condense and settle upon the filtering surfaces and produce clogging. When on the other hand one or more of the downstream heat-exchange sections used in the kiln are of the reverse-helical type described above, the production of dust is greatly reduced and a more thorough filtering action can be provided for in the input section of the furnace without clogging or reducing the output, thereby increasing both the efficiency and the production capacity of the furnace.

The relative dimensioning of the grooves or channels in the improved heat exchange structure, as well as the number of said grooves, and the pitch of the opposed helical segments, may be varied considerably depending on particular requirements. It has been found that selection of the length of the intermediate straight segment $b$ (FIG. 2) provides a means of adjusting the effective talus angle of the solid material in the channels for a given rotational velocity of the kiln. The number of grooves used will depend on the sectional area through the kiln, it being noted that the larger the number of channels the greater the surface area of heat exchange between gas and solids provided for a given flow rate. The length and pitch of the helical segments will influence the rate of feed of the materials through the kiln.

Among the advantages of the heat exchange structure of the invention when used in a rotary furnace or kiln as here described, is the outstanding fact that the structure provides an extremely efficient screen against the heat radiated in the axial direction from the high-temperature reaction zone situated downstream at the output end of the kiln back towards the upstream input zone, which is at much lower temperature. This fact increases the thermal efficiency of the process carried out in the kiln whatever the particular nature of the process, since it is a broad law in thermodynamics that high-temperature heat units should not be used in a low-temperature stage for optimum efficiency.

The heat exchange structure of the invention is susceptible of various applications other than in a rotary furnace or kiln, being applicable to any process wherein a more or less finely divided solid material is to be heated or cooled by a gaseous stream, flowing in the same direction or in counterflow relation to it. The heat exchanger may be rotatable or fixed, and may have screw conveyor means associated with it for feeding the solid materials through the channels.

Briefly summarizing the advantages of the improved heat exchange structure of the invention, it may be said to provide the following benefits:

(a) a considerable multiplication of the heat exchange area between the solids and gas, limited only by the number of channels that can be provided;

(b) a more thorough mixing of the materials, thereby improving the uniformity of the temperatures therein and the chemical composition thereof; when applied to a rotary kiln, the improved uniformity in the reaction zone improves the quality and uniformity of the product;

(c) maintaining a low or moderate pressure drop in the gas flow path, and hence reducing the amount of dust entrained with the gas stream;

(d) as a consequence of the foregoing, a more thorough filtering of the solids can be effected in the upstream portion of a kiln having the heat exchanger mounted therein, while increasing the output;

(e) an improvement in the granular condition of the clinker in a cement kiln, improving in turn the operation of the means used for recovering the sensible heat from the clinker and achieving a saving on the consumption of heat energy.

Various modifications may be made in the structures described and illustrated without departing from the scope of the invention. For example, the intermediate straight segment (such as b, FIG. 1) may in some cases be omitted. The helical segments may be made of non-uniform pitch.

What I claim is:

1. In a rotary kiln for the manufacture of cement and the like having a generally cylindrical outer shell, the combination therewith of a heat exchange structure comprising means in the shell subdividing it into a plurality of separate channels, said means including a member disposed in said shell having a plurality of generally radially disposed flanges, the flanges having their outer ends abutting the inner walls of the shell and their inner ends interconnected, said radially disposed flanges on said member including first portions forming a longitudinally extending helix having a pitch in one direction, a second portion forming a longitudinally extending helix having a pitch in the opposite direction from the pitch of the helix of the first portion, and a generally straight portion connecting said first and second portions.

2. A combination as claimed in claim 1, wherein said first portion of each of the flanges of said member is substantially longer than the second portion thereof.

3. In a rotary kiln for processing solid material passing therethrough having a generally cylindrical shell, the combination therewith of a heat exchange structure, comprising an input section at one end of the shell having means therein for filtering the solid material, a first heat exchange section downstream of said input section having means therein defining a plurality of separate helical channels, said means including a member having a plurality of spaced-apart radial flanges of which the outer ends abut the inner wall of the shell and the inner ends are interconnected, and at least one second heat exchange section downstream of said first section and having means therein defining a plurality of separate channels, said last-named means including a member having a plurality of spaced-apart radial flanges having their outer ends abutting the inner walls of the shell and their inner ends interconnected, each of said flanges including a first portion forming a longitudinally extending helix having a pitch of the same direction as the pitch of helical chambers in said first section of the kiln, a second portion downstream of said first portion forming a helix of the opposite direction, and a generally straight portion intermediate said first and second portions.

4. A combination as claimed in claim 3, wherein the number of helical channels in said first section is greater than the number of separate channels defined in said second section.

5. A combination as claimed in claim 3, wherein said second section is spaced apart longitudinally from said first section.

6. A combination as claimed in claim 3, wherein said first portion of each of the flanges of the member in said second section is substantially longer than said second portion.

References Cited by the Examiner

UNITED STATES PATENTS

| 2,653,809 | 9/53 | Azbe | 263—32 |
| 2,879,052 | 3/59 | Azbe | 263—33 |
| 2,939,693 | 7/60 | Old et al. | 263—33 |

FOREIGN PATENTS

| 743,535 | 1/33 | France. |
| 948,774 | 2/49 | France. |

WILLIAM F. O'DEA, *Acting Primary Examiner.*

JOHN J. CAMBY, CHARLES SUKALO, *Examiners.*